United States Patent
Yang et al.

(10) Patent No.: US 7,754,961 B1
(45) Date of Patent: Jul. 13, 2010

(54) STRUM INPUT FOR A VIDEO GAME CONTROLLER

(75) Inventors: Jamie Jien-Mei Yang, San Jose, CA (US); Johnnie Tam, San Jose, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 11/403,662

(22) Filed: Apr. 12, 2006

(51) Int. Cl.
*G10H 1/32* (2006.01)
*G10H 1/18* (2006.01)
*A63H 33/30* (2006.01)
*A63F 9/24* (2006.01)
*G06F 17/00* (2006.01)
*G06F 19/00* (2006.01)

(52) U.S. Cl. .............................. 84/743; 84/645; 84/646; 446/408; 273/148 R; 273/148 B; 273/460; 463/36; 463/37

(58) Field of Classification Search .................... 84/600, 84/723, 743, 737, 739, 645, 646; 200/43.13, 200/43.18, 412; 16/262; 292/281; 267/150, 267/72; 74/526, 527; 446/408; 273/148 R, 273/148 B, 460; 463/36, 37
See application file for complete search history.

(56) References Cited

U.S. PATENT DOCUMENTS

| | | | |
|---|---|---|---|
| 3,742,114 A * | 6/1973 | Barkan .......................... | 84/740 |
| 3,932,722 A * | 1/1976 | Obata et al. .................. | 200/513 |
| 4,177,705 A | 12/1979 | Evangelista | |
| 4,794,838 A * | 1/1989 | Corrigau, III ................. | 84/600 |
| 5,095,799 A | 3/1992 | Wallace et al. | |
| 5,689,253 A * | 11/1997 | Hargreaves et al. ........... | 341/22 |
| 5,726,374 A | 3/1998 | Vandervoort | |
| 5,777,251 A | 7/1998 | Hotta et al. | |
| 6,018,119 A | 1/2000 | Mladek | |
| D427,244 S | 6/2000 | Muraki et al. | |
| 6,142,849 A | 11/2000 | Horton et al. | |
| 6,225,547 B1 * | 5/2001 | Toyama et al. ................. | 84/611 |
| 6,342,665 B1 | 1/2002 | Okita et al. | |
| 6,444,887 B1 | 9/2002 | Hiraoka et al. | |
| 6,479,741 B1 | 11/2002 | Morton et al. | |

* cited by examiner

*Primary Examiner*—Jeffrey Donels
*Assistant Examiner*—Andrew R Millikin
(74) *Attorney, Agent, or Firm*—Klein, O'Neill & Singh, LLP

(57) ABSTRACT

A video game controller includes: a string instrument-shaped housing comprising a body portion and a neck portion, said body portion including a opening; a console interface for coupling with a game console; and a strum interface coupled to the console interface. The strum interface includes: a pin having a central portion and distal end portions; a pin support structure for supporting the distal end portions of the pin; a strum bar comprising a body portion rotatably coupled to the central portion of the pin and a flange portion protruding from the opening in the housing; a compressible liner provided between at least a portion of the strum bar and the pin; an upper button positioned adjacent the strum bar so as to be depressed when the strum bar is rotated in a first direction; and a lower button positioned adjacent the strum bar so as to be depressed when the strum bar is rotated in a second direction.

9 Claims, 6 Drawing Sheets

STRUM INPUT FOR A VIDEO GAME CONTROLLER

BACKGROUND

Video game systems have become extremely popular in recent years, particularly the systems designed for home use. These video game systems typically include a console containing a power supply, CPU, and software for operating the console. The console typically includes an interface for reading a storage medium (e.g., a CD-ROM) containing the software for a particular game, a video interface for coupling with a display, and one or more controller interfaces for coupling with one or more game controllers. Over the years, different game controllers have been developed which enable a user to interact with the video games by manipulating the various inputs provided on the controller. Typically, the game console will be sold bundled with a generic controller for use with the majority of games compatible with that console. This generic controller may include several directional control buttons and several multi-purpose buttons. These buttons may operate as simple electrical switches indicating one of two states (e.g., pressed or not pressed) or may communicate an analog signal indicating a variety of states (e.g., how far a joystick is moved from center).

In some cases, specialized controllers for particular games or particular types of games have been developed in order to provide an increased sense a realism for the user. For example, one controller for use with driving simulation games includes a steering wheel, a shifter, and foot-operated pedals. Another controller for use with first person shooter games is shaped like a gun and includes a trigger for controlling the firing of a weapon on screen. These video game controllers must be entertaining to use, while being sufficiently durable so as to survive extended use. However, because these specialized controllers are only used with a limited number of game titles, the controllers cannot be prohibitively expensive to make.

The guitar is a very popular musical instrument, particularly among young adults, who are also a prime demographic for video games. Guitars and other stringed instruments produce sound by means of vibrating strings. Acoustic guitars include a hollow body which amplifies the vibrations to produce audible sound. Electric guitars utilize electromagnetic pickups, which sense the vibrations of the strings electronically and route an electronic signal to an amplifier and speaker. In either case, the musical sound originates with the vibrating strings which are strummed or plucked by the musician.

With driving controllers, the operation of an actual vehicle by manipulating the pedals, shifting gears, and turning the steering wheel is very easily simulated using a game controller. Similarly, with gun controllers, the operation of an actual gun by pulling a trigger is also easily simulated using a game controller. However, the strumming of guitar strings can be difficult to simulate on a game controller so as to provide a realistic gaming experience.

Accordingly, it would be desirable to provide a video game controller that simulates the operation of a string instrument while being realistic, entertaining, durable, and relatively inexpensive to manufacture.

SUMMARY

In accordance with the present invention, a video game controller is provided. The video game controller includes: a string instrument-shaped housing comprising a body portion and a neck portion, said body portion including a opening; a console interface for coupling with a game console; and a strum interface coupled to the console interface. The strum interface includes: a pin having a central portion and distal end portions; a pin support structure for supporting the distal end portions of the pin; a strum bar comprising a body portion rotatably coupled to the central portion of the pin and a flange portion protruding from the opening in the housing; a compressible liner provided between at least a portion of the strum bar and the pin; an upper button positioned adjacent the strum bar so as to be depressed when the strum bar is rotated in a first direction; and a lower button positioned adjacent the strum bar so as to be depressed when the strum bar is rotated in a second direction.

In accordance with other embodiments of the present invention, a video game controller is provided. The video game controller includes: a string instrument-shaped housing comprising a body portion and a neck portion, said body portion including a opening; a console interface for coupling with a game console; and a strum interface coupled to the console interface. The strum interface includes: a strum bar comprising a body portion rotatably mounted in the housing and a flange portion protruding from the opening in the housing; an upper button positioned adjacent the strum bar so as to be depressed when the strum bar is rotated in a first direction, said upper button including a first switch and providing a counterforce when depressed by the strum bar, said counterforce increasing as the upper button is compressed to closure and decreasing after the first switch is closed; and a lower button positioned adjacent the strum bar so as to be depressed when the strum bar is rotated in a second direction, said lower button including a second switch and providing a counterforce when depressed by the strum bar, said counterforce increasing as the upper button is compressed to closure and decreasing after the second switch is closed.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Figure 1:
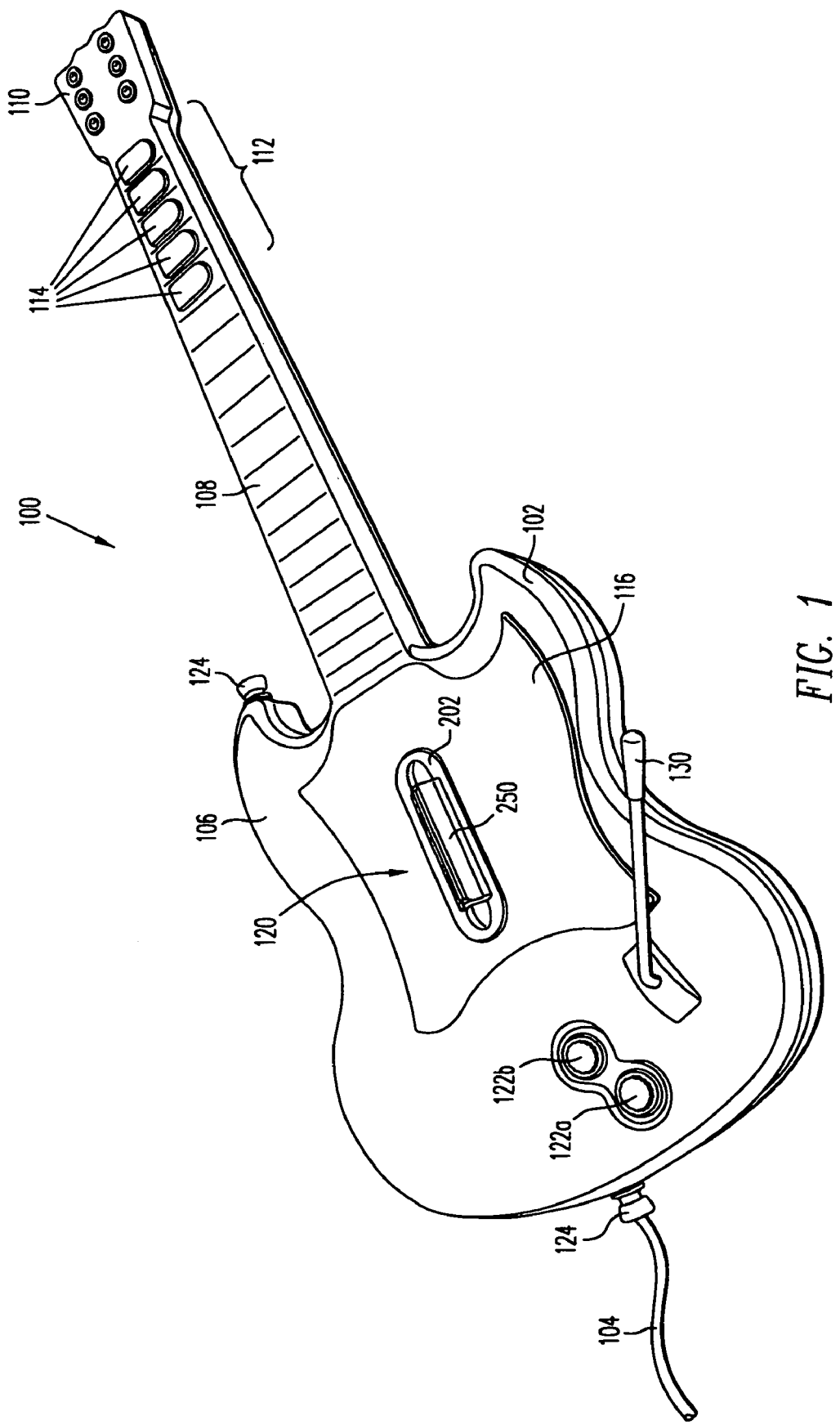
FIG. 1 is a perspective view of a video game controller in a string instrument-shaped housing, in accordance with embodiments of the present invention.

FIG. 1 is a perspective view of a video game controller in a string instrument-shaped housing, in accordance with embodiments of the present invention. In this embodiment, the game controller 100 comprises a guitar-shaped housing 102 having a cord 104 for connection with a video game console (not shown). The housing 102 may come in a variety of shapes, but in this embodiment is styled after the SG® guitar by Gibson USA.

The housing 102 includes a body portion 106, a neck portion 108, and a head portion 110. The body portion 106 comprises a pickguard 116, a strum interface 120, a tremolo arm 130, and a pair of control buttons 122a-122b. The control buttons 122a-122b may correspond to "Start" and "Select" for controlling the operation of a video game. A pair of strap buttons 124 may be provided for connection with a strap (not shown) for supporting the controller 100 from a user's neck. The neck portion 108 comprises a fretboard interface 112 including a plurality of fret buttons 114 (five buttons 114 are provided in the illustrated embodiment).

Embodiments of the game controller 100 may be utilized in conjunction with any of a variety of video game systems. In one embodiment, the game controller 100 is configured for use with the PLAYSTATION 2® video game console by Sony Computer Entertainment America, Inc. In this case, the cord 104 terminates at standard console connector (not shown) which is removably couplable with a controller port on the PLAYSTATION 2®. Control logic is provided in the game controller 100 for generating control signals to be transmitted to the video game console in response to detection of a user's interaction with the fretboard interface 112, the strum interface 120, the control buttons 122a-122b, and the tremolo arm 130. The connector, the control logic, and the signals transmitted by the game controller 100 to the game console via the cord 104 may be defined by standards established by the video game console manufacturer. The video game console, in turn, includes audio and video outputs for connection with a television or other video display. Typically, the display will include both a video display and an audio output, such as speakers. In some cases, the audio output will be provided by a separate sound system.

In contrast with actual guitars, the guitar controller 100 does not include strings. Instead, the musician's fingering on the fretboard is simulated by the pressing of the fret buttons 114 and the strumming of the strings is simulated by the strumming of the strum interface 120, as will be described in greater detail below.

Figure 2:
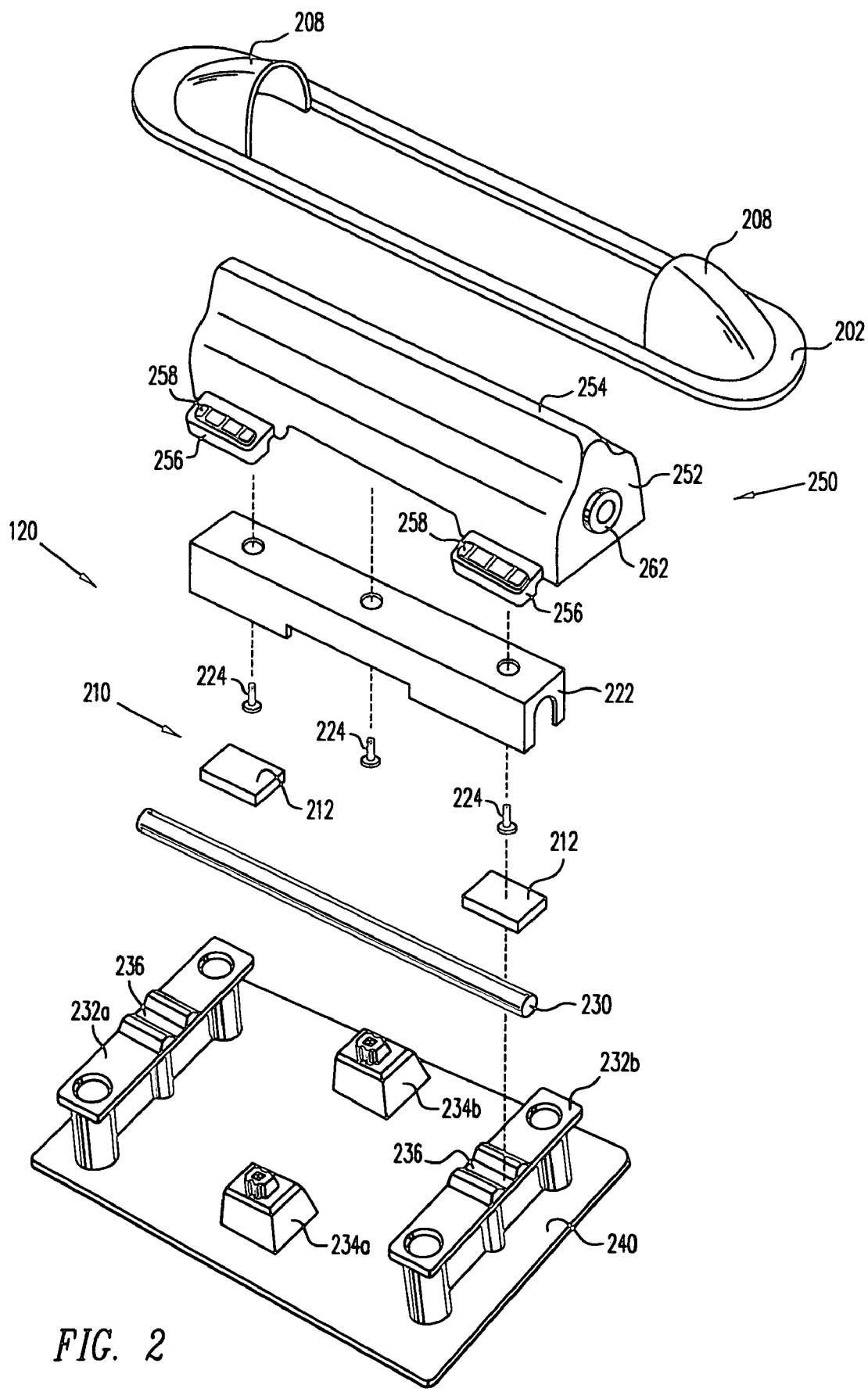
FIG. 2 is an exploded top view of a strum interface for the game controller.
Figure 3:
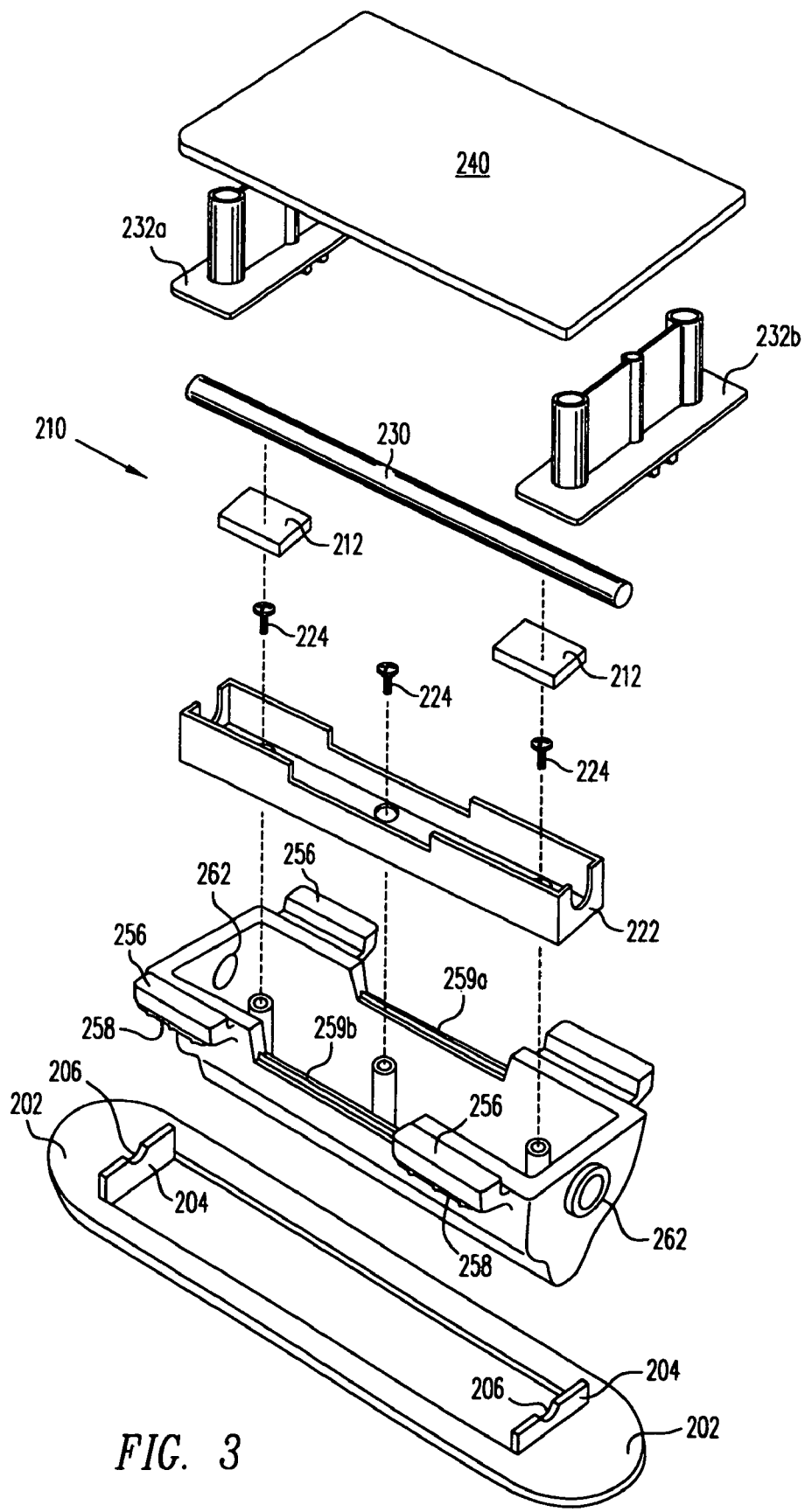
FIG. 3 is an exploded bottom view of the strum interface for the game controller.
Figure 4:
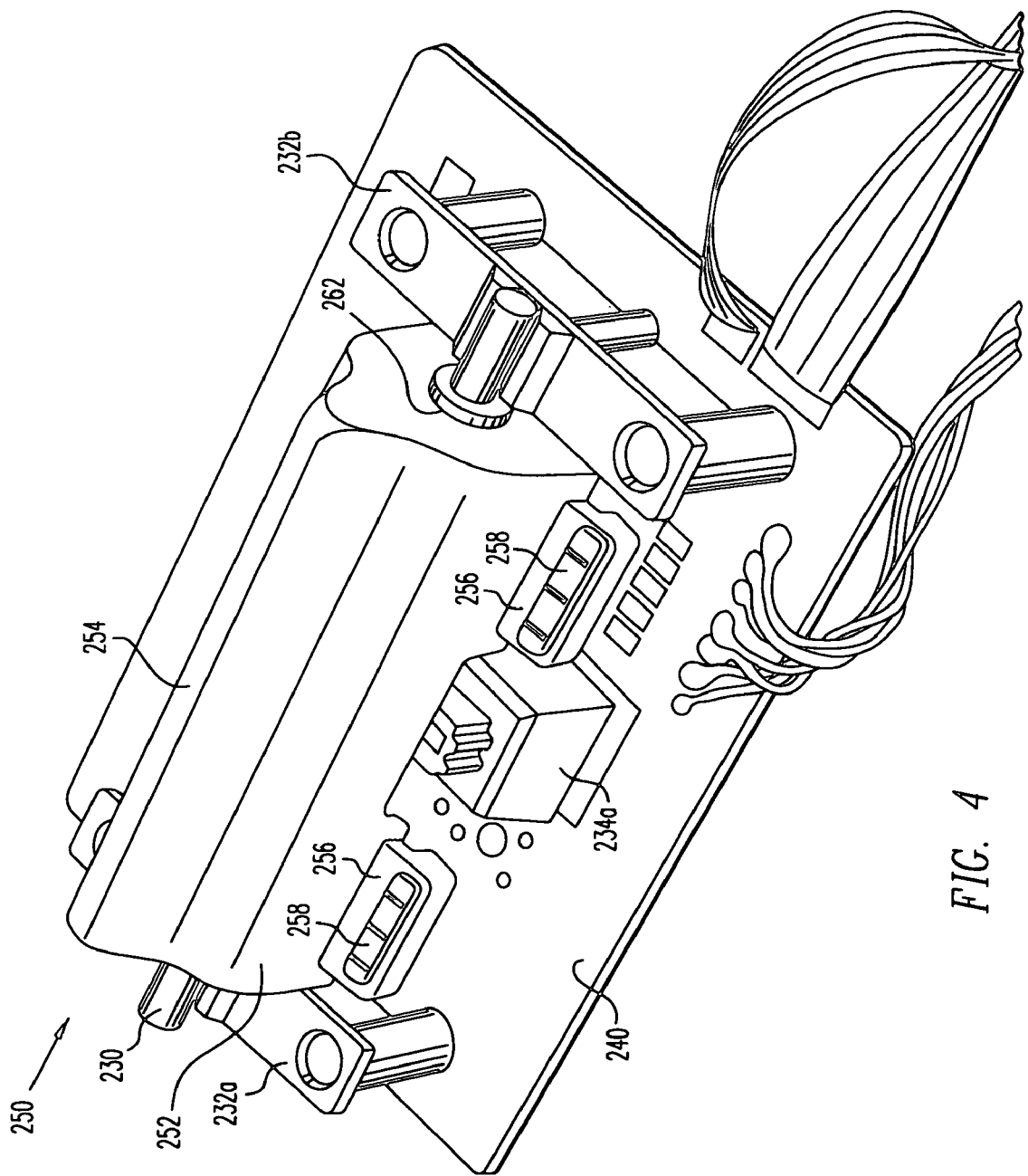
FIG. 4 is a perspective view of the strum interface with the housing removed.

FIG. 2 is an exploded top view of the strum interface 120 for the game controller 100. FIG. 3 is an exploded bottom view of the strum interface 120. FIG. 4 is a perspective view of the strum interface 120 with the housing 102 removed.

A portion of the housing 102 forms a window 202 which provides access to a strum bar 250. The strum bar 250 comprises a body portion 252 and a flange portion 254 which protrudes from the window 202. The strum bar 250 further comprises two pairs of range-limiting flanges 256 which extend from the body portion 252 beneath the window 202. A compressible pad 258 is provided on each range-limiting flange 256 facing the window 202. An opening 262 is provided at each end of the body portion 252. A pin 230 passes through the strum bar 250 and extends out of each opening 262.

An insert 222 is provided inside of the strum bar 250 and is secured to the strum bar 250 using screws 224. A liner 210 comprising a pair of compressible pads 212 is adhered to the insert 222 and is slightly compressed between the insert 222 and the pin 230 when the pin 230 is inserted into the strum bar 250.

A pair of support brackets 232a-232b are mounted onto a printed circuit board (PCB) 240. Each bracket 232 includes a notch 236. The notches 236 correspond with notches 206 on flanges 204 on the window 202 for receiving the ends of the pin 230 which extend out of the openings 262. An upper button 234a and a lower button 234b are also mounted onto the PCB 240 adjacent the edges 259a-259b of the strum bar 250 for detecting movement of the strum bar 250, as will be described in greater detail below.

Figure 5:
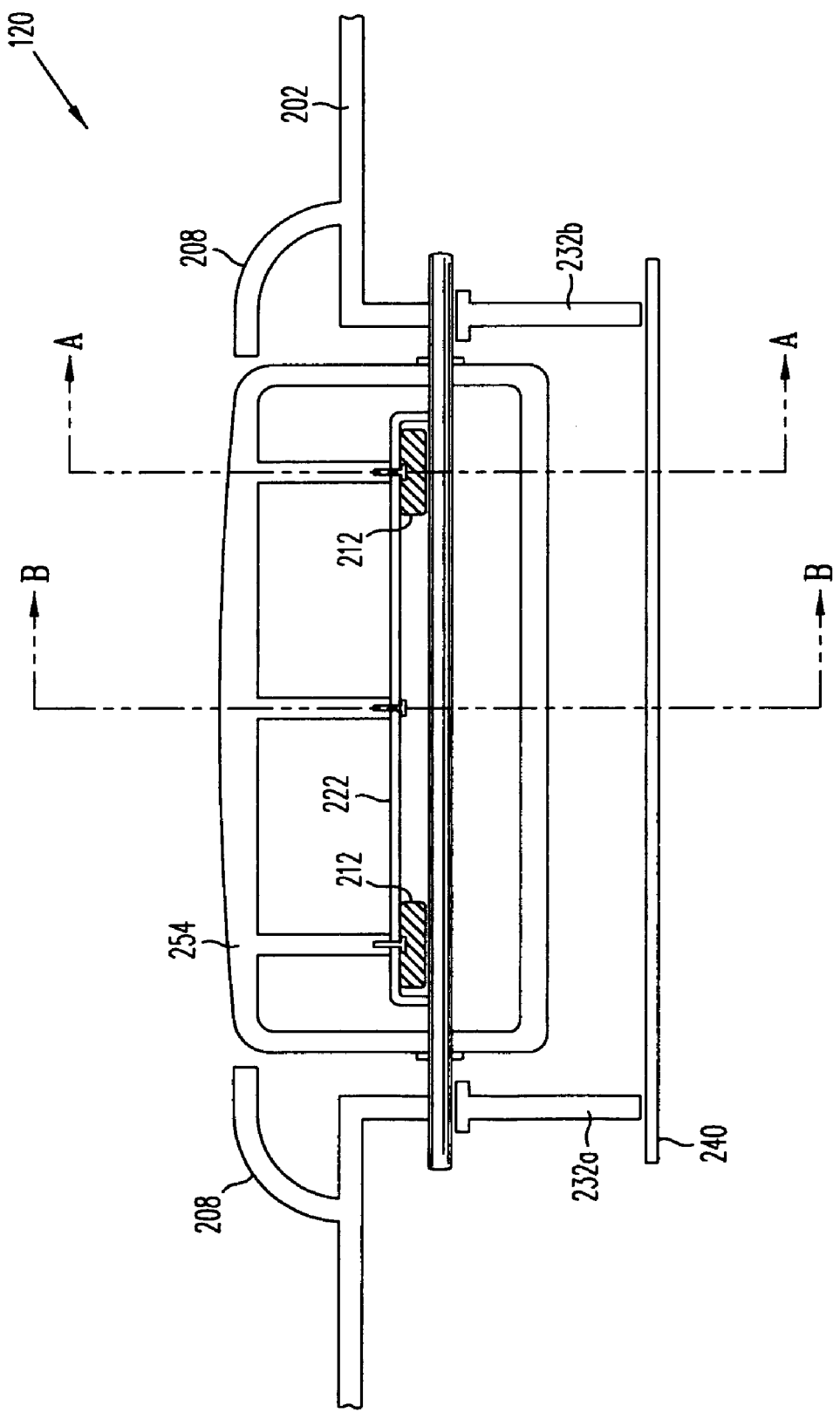
FIG. 5 is a cross-sectional view of the strum interface taken along the axis formed by the pin.
Figure 6:
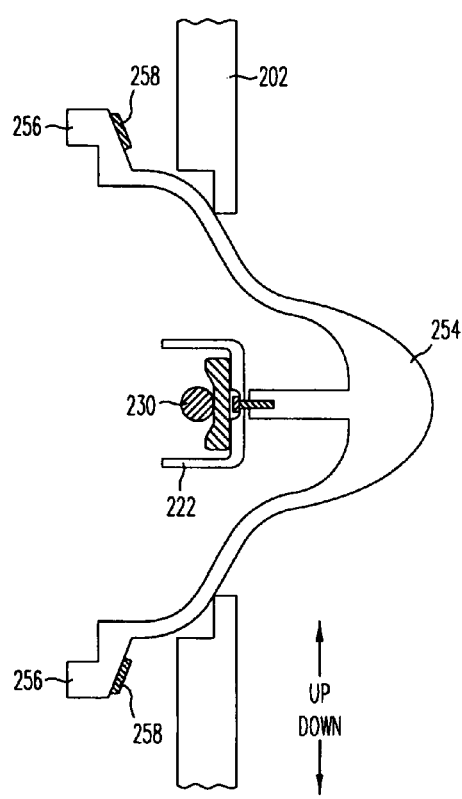
FIG. 6 is a cross-sectional view of the strum interface taken along the line A-A in FIG. 5.

FIG. 5 is a cross-sectional view of the strum interface 120 taken along the axis formed by the pin 230. FIG. 6 is a cross-sectional view of the strum interface 120 taken along the line A-A in FIG. 5, and FIG. 7 is a cross-sectional view of the strum interface 120 taken along the line B-B in FIG. 5.

The pin 230 is inserted into the strum bar 250 so as to allow the strum bar 250 to rotate about the pin 230. As can be seen in FIG. 5, the flange portion 254 of the strum bar 250 roughly aligns with the hood portions 208 of the window 202. The hood portions 208 provide protection for the strum bar 250 so that if other items are placed on top of the controller 100, the hood portions 208 will prevent the strum bar 250 from being crushed or broken. At the same time, the flange portion 254 of the strum bar 250 remains accessible to the user for strumming during operation.

Figure 7:
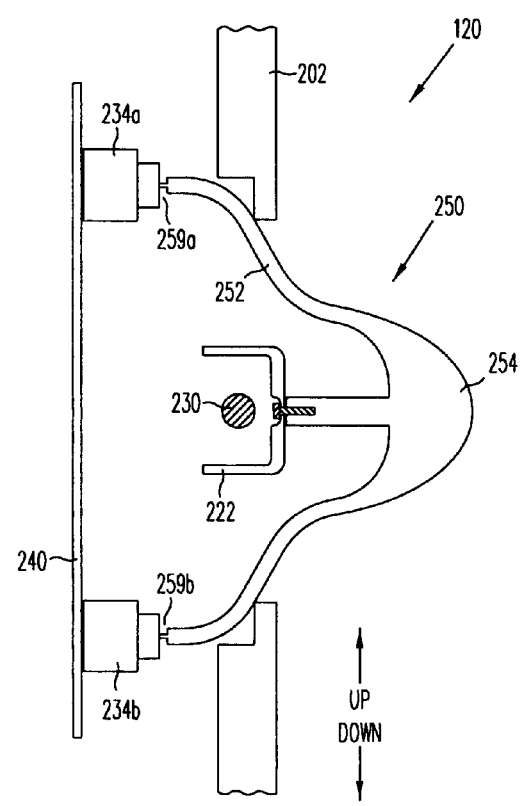
FIG. 7 is a cross-sectional view of the strum interface taken along the line B-B in FIG. 5.

FIGS. 6 and 7 depict the orientation of the strum interface 120 during typical use when the controller 100 is placed in front of the user similar to a normal guitar. The up and down directions are shown in FIGS. 6 and 7 and described herein for ease of discussion, but it is understood that these directions are relative and the controller 100 may be operated while being oriented in any direction.

In operation, the controller 100 will typically be used in conjunction with a compatible video game running on the video game console. This game will generally provide cues to the user to indicate when and how the user should interact with the controller 100. For example, the video game software running on the console may cause the display to depict colors and/or shapes to indicate which fret buttons 114 to hold down while strumming on the strum interface 120, and the movement of these colors and/or shapes on the display will indicate the timing of the strumming. Points or other incentives are provided each time the user holds down the appropriate fret button 114 while strumming on the strum interface 120 at the appropriate time. The tremolo arm 130 may be used in combination with the fret buttons 114 and strum interface 120 to modulate the sound produced while strumming. Exemplary tremolo arms are described in U.S. patent application entitled, "TREMOLO ARM INPUT FOR A VIDEO GAME CONTROLLER", by Johnnie Tam and Jamie J. Yang, filed on Apr. 12, 2006, (Ser. No. 11/403,659) the contents of which are incorporated herein in its entirety In order to strum the strum interface, a user may use his or her hand to strike the upper or lower surface of the flange portion 254 protruding from the window 202, similar to how a musician will strike the strings on a guitar while strumming. Alternatively, the user may flick the flange portion 254 as if plucking a single string. If a user strikes downward onto the flange portion 254, the strum bar 250 will rotate in the clockwise direction (as shown in FIGS. 6 and 7). As the strum bar 250 rotates, the bottom edge 259b will press down upon the lower button 234b. After the strum bar 250 has rotated a prescribed distance, a switch in the lower button 234b will be closed, thereby causing the control logic in the controller 100 to transmit a corresponding signal to the game console indicating that the strum bar 120 has been strummed.

At the same time that the switch is closed, the lower button 234b will provide a tactile and audible click to provide feedback to the user that the strumming of the strum bar 250 has been detected. Similarly, if a user strikes upward onto the flange portion 254, the strum bar 250 will rotate so as to cause the upper edge 259a to depress the upper button 234a. When the strum bar 250 is rotated by the user, the edge 259 will apply a compressive force on the button 234, while the button 234 provides a counterforce against the compressive force applied by the user. The tactile feedback to the user may be enhanced by increasing the counterforce provided by the button 234 as the button 234 is compressed, and then dramatically reducing the counterforce at the time that the switch is closed and the audible feedback (e.g., a click) is produced. Any of a variety of commercially-available buttons may be used to provide suitable tactile and audible feedback.

The upper and lower buttons 234a-234b include springs which provide the counterforce onto the edge 259 of the strum bar 250. The counterforce from the springs also provide a rebound force to return the buttons 234a-234b into the open position after the buttons 234a-234b have been compressed. Accordingly, after the user has ceased applying the striking force onto the strum bar 250, the depressed button 234a will apply a counterforce onto the corresponding edge 259 of the strum bar 250, thereby causing the strum bar 250 to return to its default position, as shown in FIGS. 6-7. In the default position, both buttons 234a-234b are in the open position and apply balanced forces onto the edges 259a-259b of the strum bar 250 so as to maintain the strum bar 250 in the default position until the next time the user strikes the flange 254.

In accordance with another aspect of the present invention, a pair of rotation-limiting flanges 256 are provided along the edges of the strum bar 250. Compressible pads 258 are provided on each flange 256. When the user strikes the strum bar 250, the strum bar 250 rotates until the pads 258 of the flanges 256 contact an edge portion of the window 202. The flanges 256 are positioned on the strum bar 250 so as to allow the strum bar 250 to rotate far enough to fully close the buttons 234a-234b and provide the user with the tactile and audible feedback. However, the flanges 256 are positioned to stop further rotation after the buttons 234a-234b are closed. As a result, the flanges 256 limit the range of rotation allowed for the strum bar 250, thereby preventing damage to the buttons 234a-234b caused by excessive pressure on the buttons 234a-234b by the strum bar 250, while still maintaining a high level of feedback to the user.

In some embodiments, these compressible pads 258 are made of a moderately compressible material, such as, e.g., rubber or other polymer. The use of a moderately compressible material may be desirable because when the rotation of the strum bar 250 is stopped by the flange 256, the compressibility of the pad 258 prevents the user from feeling a harsh and abrupt contact between the flange 256 and the edge of the window 202. At the same time, some firmness is desirable in order to provide some rigidity to the strum bar 250 and to prevent the strum bar 250 from feeling overly soft. In other embodiments, it may be desirable to use a highly compressible material, such as ethylene-vinyl acetate (EVA) foam, in order to gently stop further rotation of the strum bar 250. This will provide a different tactile sensation for the user.

In accordance with another aspect of the present invention, a compressible liner is used to prevent undesirable vibrations in the strum bar 250 during use. As described above, the strum bar 250 is rotatably mounted onto the pin 230 so that the strum bar 250 may rotate up and down about the pin 230. The openings 262 in the strum bar 250 receive the pin 230 and will typically be slightly larger in diameter than the pin 230 so that the strum bar 250 may rotate freely without excessive friction between the edges of the openings 262 and the pin 230. As a result, the strum bar 250 may vibrate undesirably during use, causing an undesirable tactile and audible feedback to the user.

As shown in FIGS. 2, 3, and 6, compressible pads 212 are provided between the strum bar 250 and the pin 230 so as to dampen any vibrations of the strum bar 250. In the illustrated embodiment, an insert 222 is provided inside of the strum bar 250, and a pair of compressible pads 212 are adhered to the insert 222 to form the liner 210. In some embodiments, these compressible pads 212 are made of a highly compressible material, such as, e.g., EVA foam.

Embodiments of the present invention may provide various advantages not provided by prior art systems. For example, the use of the buttons 234 and the range-limiting flanges 256 can provide a user with a gaming experience that effectively simulates the actual strumming of a guitar. The clicking of the buttons 234 and the rebound force provided by the springs in the buttons 234 can simulate the snap of a finger plucking a guitar string.

In addition, the use of a metal pin 230 for supporting the strum bar 250 can provide additional durability for the controller 100. It is not unusual for a video game to be played for hours on end with the user interacting with the controller in an extremely rough fashion. It is important that the controller 100 be able to survive such severe operational conditions.

Moreover, the use of the compressible pads 212 to dampen vibrations can advantageously reduce the amount of noise generated by vibrations. This noise can undesirably interfere with the game audio.

While the invention has been described in terms of particular embodiments and illustrative figures, those of ordinary skill in the art will recognize that the invention is not limited to the embodiments or figures described. For example, in the embodiments described above, the controller includes a housing shaped like an electric guitar. In other embodiments, the housing may be provided in the shape of other string instruments, such as an acoustic guitar, banjo, or lute. In addition, the precise shape and size of the strum bar may vary.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A game controller comprising:
   a string instrument-shaped housing comprising a body portion and a neck portion, said body portion including an opening;
   a console interface for data coupling with a game console;
   a strum interface coupled to the console interface, comprising:
   a pin having a central portion and distal end portions;
   a pin support structure for supporting the distal end portions of the pin;
   a strum bar comprising a body portion rotatably coupled to the central portion of the pin and a flange portion protruding from the opening in the housing;

an upper button positioned adjacent the strum bar so as to be depressed when the strum bar is rotated in a first direction;

a lower button positioned adjacent the strum bar so as to be depressed when the strum bar is rotated in a second direction; and wherein the strum bar further comprises an upper range-limiting flange for contacting an upper edge portion of the opening of the housing to limit rotation of the strum bar in the first direction, and a lower range-limiting flange for contacting a lower edge portion of the opening of the housing to limit rotation of the strum bar in the second direction.

2. The game controller of claim 1, wherein:

the upper range-limiting flange further comprises an upper compressible pad for contacting the upper edge portion of the opening of the housing; and the lower range-limiting flange further comprises a lower compressible pad for contacting a lower edge portion of the opening of the housing.

3. The game controller of claim 2, wherein:

the upper compressible pad and the lower compressible pad are comprised of rubber.

4. A game controller comprising:

a string instrument-shaped housing comprising a body portion and a neck portion, said body portion including an opening;

a console interface for coupling with a game console;

a strum interface coupled to the console interface, comprising:

a strum bar comprising a body portion rotatably mounted in the housing and a flange portion protruding from the opening in the housing;

an upper button positioned adjacent the strum bar so as to be depressed when the strum bar is rotated in a first direction, said upper button including a first switch and providing a counterforce when depressed by the strum bar and configured to provide audible feedback when depressed, said counterforce increasing as the upper button is compressed;

a lower button positioned adjacent the strum bar so as to be depressed when the strum bar is rotated in a second direction, said lower button including a second switch and providing a counterforce when depressed by the strum bar and configured to provide audible feedback when depressed, said counterforce increasing as the upper button is compressed; and wherein the strum bar further comprises an upper range-limiting flange for contacting an upper edge portion of the opening of the housing to limit rotation of the strum bar in the first direction, and a lower range-limiting flange for contacting a lower edge portion of the opening of the housing to limit rotation of the strum bar in the second direction.

5. The game controller of claim 4, wherein:

the upper range-limiting flange further comprises an upper compressible pad for contacting the upper edge portion of the opening of the housing; and the lower range-limiting flange further comprises a lower compressible pad for contacting a lower edge portion of the opening of the housing.

6. The game controller of claim 5, wherein:

the upper compressible pad and the lower compressible pad are comprised of rubber.

7. A game controller, comprising:

a string instrument-shaped housing comprising a body portion and a neck portion, said body portion including an opening;

a console interface for data coupling with a game console;

a strum interface coupled to the console interface, comprising:

a pin having a central portion and distal end portions;

a pin support structure for supporting the distal end portions of the pin;

a strum bar comprising a body portion rotatably coupled to the central portion of the pin and a flange portion protruding from the opening in the housing;

an upper button positioned adjacent the strum bar so as to be depressed when the strum bar is rotated in a first direction;

a lower button positioned adjacent the strum bar so as to be depressed when the strum bar is rotated in a second direction; and a compressible liner provided between at least a portion of the strum bar and the pin.

8. The game controller of claim 7, further comprising:

an insert coupled to the strum bar, said compressible liner being attached to the insert between the insert and the pin.

9. The game controller of claim 7, wherein said compressible liner is comprised of ethylene-vinyl acetate (EVA) foam.

* * * * *